(12) United States Patent
Zhang

(10) Patent No.: US 12,385,824 B2
(45) Date of Patent: Aug. 12, 2025

(54) GAS SENSOR

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 240 days.

(21) Appl. No.: 18/454,772

(22) Filed: Aug. 23, 2023

(65) Prior Publication Data

US 2024/0219293 A1 Jul. 4, 2024

Related U.S. Application Data

(63) Continuation of application No. PCT/CN2023/084807, filed on Mar. 29, 2023.

(30) Foreign Application Priority Data

Dec. 30, 2022 (CN) .......................... 202223604505.8

(51) Int. Cl.
*G01N 21/17* (2006.01)
*G01N 21/3504* (2014.01)

(52) U.S. Cl.
CPC ..... *G01N 21/1702* (2013.01); *G01N 21/3504* (2013.01); *G01N 2021/1704* (2013.01)

(58) Field of Classification Search
CPC ........... G01N 21/1702; G01N 21/3504; G01N 2021/1704
See application file for complete search history.

(56) References Cited

U.S. PATENT DOCUMENTS

2022/0187193 A1\* 6/2022 Uehlinger .......... G01N 21/3504

\* cited by examiner

*Primary Examiner* — Jamil Ahmed
(74) *Attorney, Agent, or Firm* — Wiersch Law Group

(57) ABSTRACT

The present disclosure provides a gas sensor, including a shell with a receiving cavity, an infrared transmitter, an acoustic sensor and a partition plate accommodated in the receiving cavity. The partition plate is connected with the substrate and the side wall, the partition plate divides the receiving cavity into a first receiving cavity and a second receiving cavity, the acoustic sensor is located in the first receiving cavity, the infrared transmitter is located in the second receiving cavity. Compared with the related art, the gas sensor disclosed by the present disclosure could improve the sensitivity of the product.

7 Claims, 3 Drawing Sheets

GAS SENSOR

FIELD OF THE PRESENT DISCLOSURE

The present disclosure relates to the technical field of sensors, and in particular relates to a gas sensor.

DESCRIPTION OF RELATED ART

A gas sensor is a converter that converts a certain gas volume fraction into a corresponding electric signal. Existing gas sensors usually include a housing, a damping net, a substrate, an infrared transmitter, and an acoustic sensor. the external gas passes through the damping net through diffusion and is balanced with the internal gas concentration. When the sensor is working, the infrared transmitter emits infrared light of a specific wavelength at a certain sound frequency (e.g., 30 Hz). This wavelength of the infrared light is strongly absorbed by the gas to be measured and converted into heat. An alternating pressure signal is generated in the internal chamber, which is received by the acoustic sensor and converted into an electric signal. The higher the concentration of the gas to be measured in the gas, the stronger the low frequency signal is. From the signal strength output by the microphone, the concentration of the gas to be measured can be calculated.

The infrared transmitter and the acoustic sensor in the related art are located in the same cavity. The modulated infrared signal produces electrical interference to the acoustic sensor, leading to measurement errors. The low strength of the electrical signal excited by the infrared signal will lead to a lack of sensitivity of the gas sensor. In addition, the external sound signal will form a strong noise interference to the gas sensor, resulting in inaccurate detection results of the gas sensor.

Therefore, it is necessary to provide a gas sensor to solve the above problems.

SUMMARY OF THE PRESENT DISCLOSURE

In view of the above, an objective of the present disclosure is to provide a gas sensor with high sensitivity.

For achieving the object mentioned above, the disclosure provides a gas sensor, including:

A gas sensor, including:
a shell with a receiving cavity, comprising a cover, a substrate spaced apart from the substrate, and a side wall located between the cover and the substrate, the cover, the substrate, and the side wall jointly enclosing to form the receiving cavity, and
an infrared transmitter, an acoustic sensor and a partition plate accommodated in the receiving cavity, wherein the partition plate is connected with the substrate and the side wall, the partition plate divides the receiving cavity into a first receiving cavity and a second receiving cavity, the acoustic sensor is located in the first receiving cavity, the infrared transmitter is located in the second receiving cavity, the shell is provided with a vent hole communicating with the outside and the second receiving cavity, the partition plate is provided with a through hole communicating with the first receiving cavity and the second receiving cavity, the first receiving cavity, the through hole, and the second receiving cavity form a Helmholtz resonant cavity, an intrinsic frequency of the Helmholtz resonant cavity is the same as a modulation frequency of the infrared transmitter.

As an improvement of the above, the side wall comprises two first side walls located on long-axis sides and two second side walls located on short-axis sides, the partition plate is connected with the two first side walls opposite to each other.

As an improvement of the above, the partition plate and the side wall are configured as an integrated structure.

As an improvement of the above, the partition plate comprises an upper surface connected to the cover and a lower surface connected to the substrate, the through hole is formed by recessing from the upper surface to the lower surface.

As an improvement of the above, a volume of the first receiving cavity is smaller than that of the second receiving cavity.

As an improvement of the above, the vent hole is provided in the cover.

As an improvement of the above, the infrared transmitter and the acoustic sensor are fixed with the substrate.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
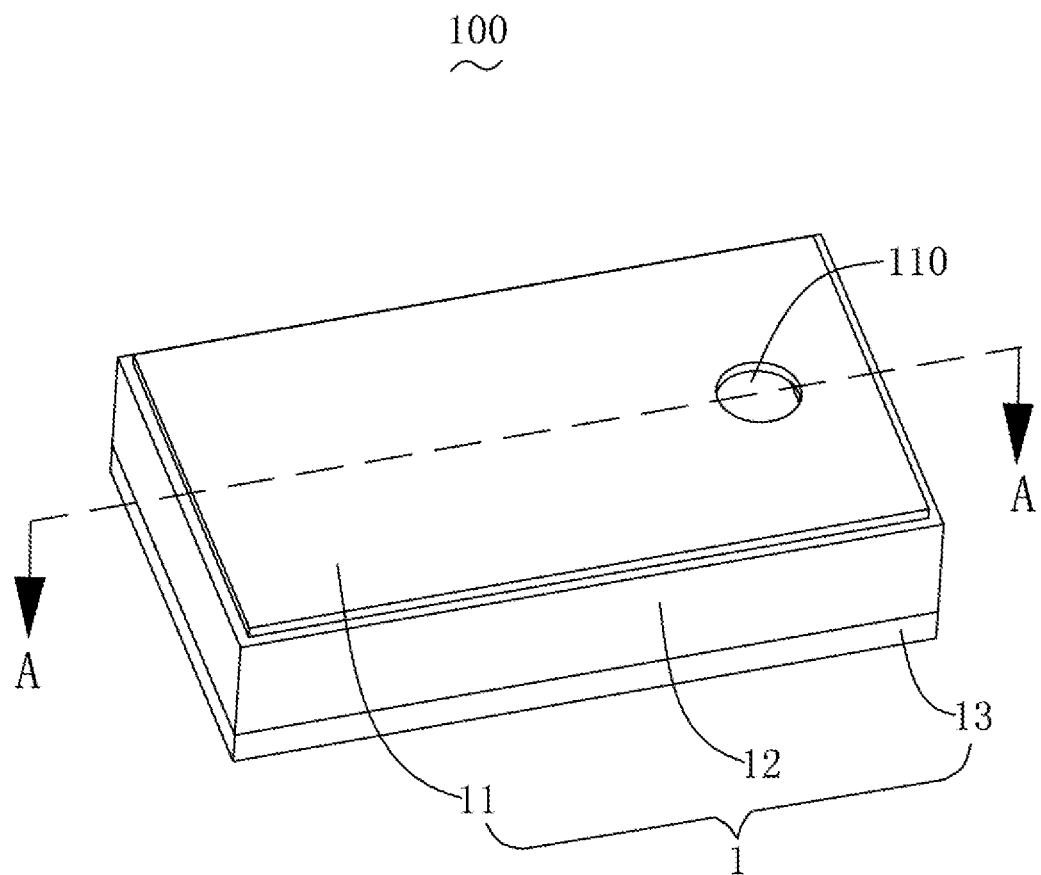
FIG. 1 is an isometric view of a gas sensor in accordance with an exemplary embodiment of the present disclosure.
Figure 2:
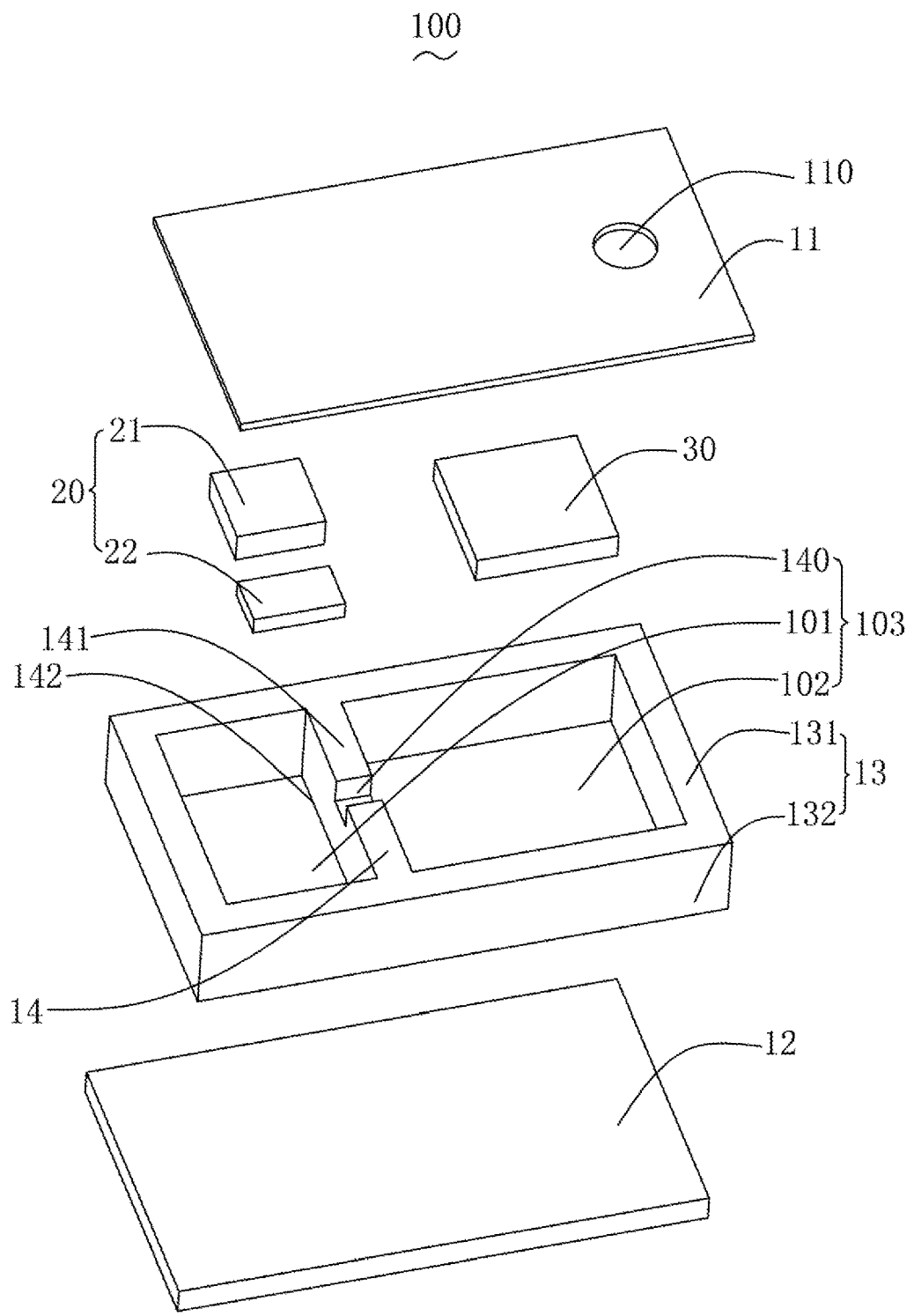
FIG. 2 is an exploded view of the gas sensor in FIG. 1.
Figure 3:
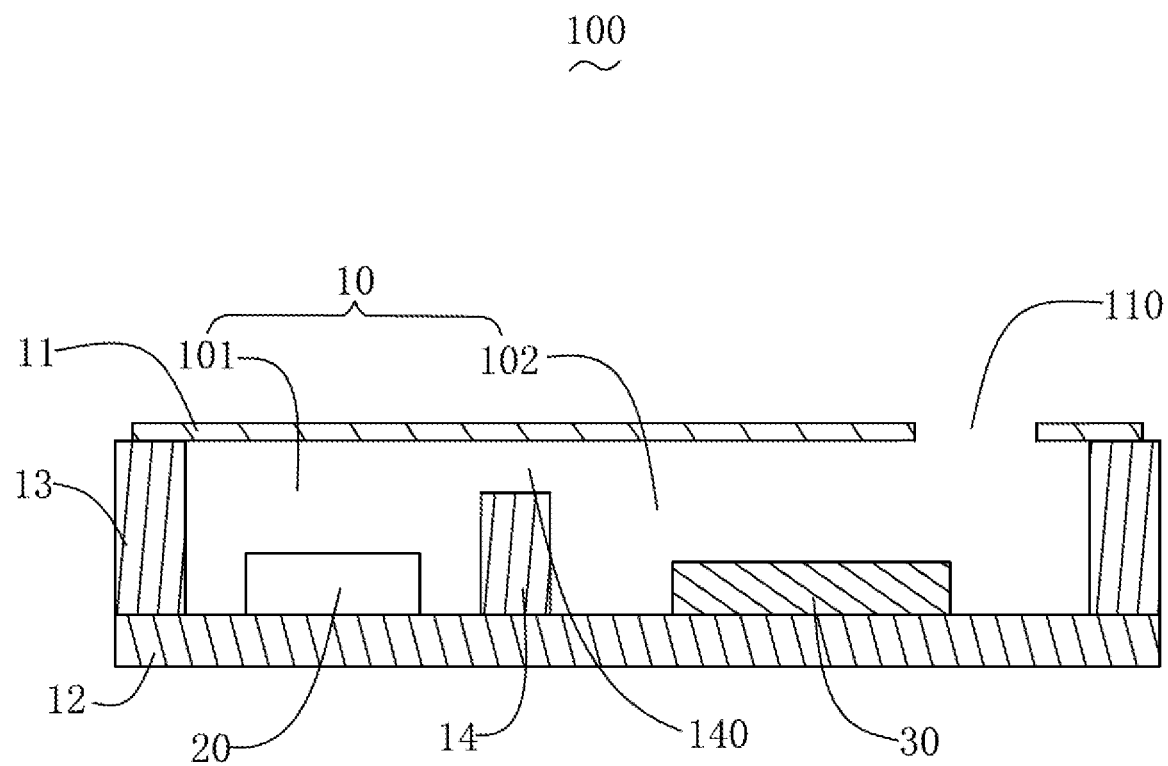
FIG. 3 is a cross-sectional view of the gas sensor taken along line A-A in FIG. 1.

Please refer to FIGS. 1-3, a gas sensor 100 includes a shell 1 with a receiving cavity 10, and an acoustic sensor 20 and an infrared transmitter 30 located in the receiving cavity 10. The shell 1 includes a cover 11, a substrate 12 spaced apart from the substrate 12, and a side wall 13 located between the cover 10 and the substrate 12, the cover 11, the substrate 12, and the side wall 13 jointly enclosing to form the receiving cavity 10. The infrared emitter 30 emits light into the receiving cavity 10, the emitted light may be infrared light, in particular, pulsed light, such as pulsed infrared light. The acoustic sensor 20 may include a microphone, in particular a MEMS microphone 21 which detects an acoustic signal caused by the emitted light according the photoacoustic principle. Thus, the acoustic sensor 20 could include an integrated circuit, such as a dedicated integrated circuit or an ASIC 22.

In the present embodiment, the gas sensor 100 further includes a partition plate 14 accommodated in the receiving cavity 10, the partition plate 14 is connected with the substrate 12 and the side wall 13. The partition plate 14 divides the receiving cavity 10 into a first receiving cavity 101 and a second receiving cavity 102, the acoustic sensor 20 is located in the first receiving cavity 101, the infrared transmitter 30 is located in the second receiving cavity 102. The partition plate 14 includes a through hole 140 communicating with the first receiving cavity 101 and the second receiving cavity 102. The first receiving cavity 101, the through hole 140, and the second receiving cavity 102 form a Helmholtz cavity 103, an intrinsic frequency of the Helmholtz resonant cavity 103 is the same as a modulation frequency of the infrared transmitter 30. In addition, the shell 1 includes a vent hole 110 communicating with the outside and the second receiving cavity 102.

The outside gas enters into the second receiving cavity 102 through the vent hole 110, the infrared transmitter 30 emits infrared light of a specific wavelength at a certain frequency (e.g., 30 Hz), This wavelength of the infrared light is strongly absorbed by the gas to be measured and converted into heat, an alternating pressure signal is generated in the second receiving cavity 102, and resonating in the Helmholtz resonance cavity 103, thus the alternating pressure signal could be converted into an electrical signal. According to the signal strength output by the acoustic sensor 20, the concentration of the gas to be measured can be calculated.

In the present embodiment, as the infrared emitter 30 and the acoustic sensor 20 are arranged in different cavities, the generation of interference signals can be avoided. In addition, the intrinsic frequency of the Helmholtz resonant cavity is the same as the modulation frequency of the infrared transmitter 30, thereby forming the acoustic resonance, which can enhance the sound signal by 10 dB-20 dB and significantly improve the sensitivity of the product. The modulation frequency of the infrared transmitter is in a range of 40 Hz-60 Hz which is much lower than a frequency of ambient noise, the ambient noise will be suppressed in the Helmholtz resonant cavity, thus reducing noise interference.

Preferably, the side wall 13 includes two first side walls 132 located on long-axis sides and two second side walls 133 located on short-axis sides, the partition plate 14 is connected with the two first side walls 132 opposite to each other. A volume of the first receiving cavity 101 is smaller than that of the second receiving cavity 102, which makes full use of the inner chamber volume and improves the sensitivity of the product. The partition plate 14 and the side wall 13 are configured as an integrated structure, thus reducing assembly steps and facilitating standardized production. In the other embodiment, the partition plate 14 and the side wall 13 could be separately formed. The partition plate 14 includes an upper surface 141 connected to the cover 11 and a lower surface 142 connected to the substrate 13, the through hole 140 is formed by recessing from the upper surface 141 to the lower surface 142, which makes easy to produce and process.

In addition, the infrared transmitter 30 and the acoustic sensor 20 are fixed to the substrate 12, the vent hole 110 is provided in the cover 11.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A gas sensor, including:
   a shell with a receiving cavity, comprising a cover, a substrate spaced apart from the substrate, and a side wall located between the cover and the substrate, the cover, the substrate, and the side wall jointly enclosing to form the receiving cavity, and
   an infrared transmitter, an acoustic sensor and a partition plate accommodated in the receiving cavity, wherein the partition plate is connected with the substrate and the side wall, the partition plate divides the receiving cavity into a first receiving cavity and a second receiving cavity, the acoustic sensor is located in the first receiving cavity, the infrared transmitter is located in the second receiving cavity, the shell is provided with a vent hole communicating with the outside and the second receiving cavity, the partition plate is provided with a through hole communicating with the first receiving cavity and the second receiving cavity, the first receiving cavity, the through hole, and the second receiving cavity form a Helmholtz resonant cavity, an intrinsic frequency of the Helmholtz resonant cavity is the same as a modulation frequency of the infrared transmitter.

2. The gas sensor as described in claim 1, wherein the side wall comprises two first side walls located on long-axis sides and two second side walls located on short-axis sides, the partition plate is connected with the two first side walls opposite to each other.

3. The gas sensor as described in claim 2, wherein the partition plate and the side wall are configured as an integrated structure.

4. The gas sensor as described in claim 1, wherein the partition plate comprises an upper surface connected to the cover and a lower surface connected to the substrate, the through hole is formed by recessing from the upper surface to the lower surface.

5. The gas sensor as described in claim 1, wherein a volume of the first receiving cavity is smaller than that of the second receiving cavity.

6. The gas sensor as described in claim 1, wherein the vent hole is provided in the cover.

7. The gas sensor as described in claim 1, wherein the infrared transmitter and the acoustic sensor are fixed with the substrate.

* * * * *